United States Patent Office.

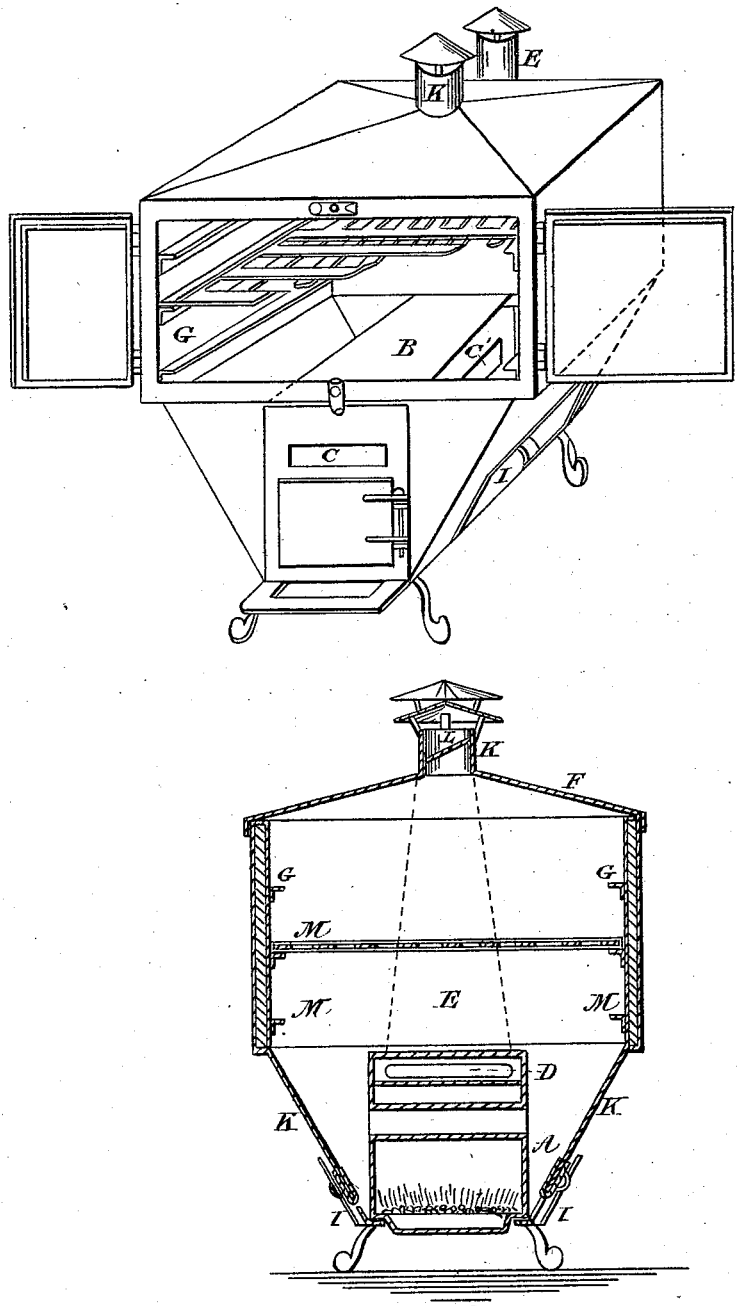

F. S. REEFY AND S. M. ZENT, OF ROANOKE, INDIANA.

Letters Patent No. 95,725, dated October 12, 1869.

BAKING AND DRYING-STOVE.

The Schedule referred to in these Letters Patent and making part of the same.

*To all whom it may concern:*

Be it known that we, F. S. REEFY and S. M. ZENT, of Roanoke, in the county of Huntington, and State of Indiana, have invented a new and improved Baking and Drying-Stove; and we do hereby declare that the following is a full, clear, and exact description thereof, which will enable others skilled in the art to make and use the same, reference being had to the accompanying drawings, forming part of this specification.

This invention relates to improvements in baking and drying-stoves, whereby it is designed to provide an attachment to a cast-iron stove, which may be used either for drying fruit or baking with great facility, and which will utilize the heat as much as possible.

Figure 1 represents a perspective view of our improved device; and

Figure 2 represents a transverse section of the same.

Similar letters of reference indicate corresponding parts.

A represents an ordinary cast-iron box-stove, over the top of which is placed a radiating-drum or chamber, B, with a space between, opening at the front, to let in air at C, and near the rear at C', on both sides.

This drum is divided by a plate, D, which causes the product of combustion to return to the front before escaping to the flue E, shown in dotted lines, fig. 2.

Above this heater we place a sheet-iron oven, F, lined on the sides with zinc, G, between which and the extension is a filling of wood, to prevent the loss of heat by radiation. These lined vertical sides rise from the horizontal plane of the top of the radiator.

Below them are inclined sides H, connecting them with the bottom of the stove.

In these sides, at their lower edges, are openings I, provided with valves, which are to be opened when the oven is used for drying fruit, to let in a greater quantity of air than is required when baking.

The valves are designed to be so shaped as to shoot the air against the side of the stove.

A ventilator, K, is provided at the top, with a valve, L, for regulating the escape of heated air, and the walls are provided with brackets M, for the support of the grates for holding the pans.

When used for baking, the opening at C admits a sufficient amount of air.

It will be observed that all, or very nearly all, of the heat given out by the stove is utilized by this arrangement.

Having thus described our invention,

What we claim as new, and desire to secure by Letters Patent, is—

1. The radiating-drum B, provided with the return-flue, and arranged relatively to the stove, and with the air-openings C C', all substantially as specified.

2. The arrangement, with the stove and oven F, of the inclined sides H, when provided with the air-passages I, and valves, substantially as specified.

3. The arrangement, in the side walls, between the zinc lining G and the exterior sheet-metal, of the wood filling, substantially as specified.

F. S. REEFY.
S. M. ZENT.

Witnesses:
   S. L. REEFY,
   JOHN BELL.